US007228784B2

(12) United States Patent
Hoch et al.

(10) Patent No.: US 7,228,784 B2

(45) Date of Patent: Jun. 12, 2007

(54) ROTARY OR PIVOTING DEVICE AND CONNECTION MODULE FOR A ROTARY OR PIVOTING DEVICE

(75) Inventors: Andreas Hoch, Talheim (DE); Frank Mössinger, Heilbronn (DE)

(73) Assignee: Schunk GmbH & Co-KG Fabrik fuer Spann-und Greifwerkzeuge, Lauffen am Neckar (DE)

( * ) Notice: Subject to any disclaimer, the term of this patent is extended or adjusted under 35 U.S.C. 154(b) by 71 days.

(21) Appl. No.: 10/551,095

(22) PCT Filed: Apr. 13, 2004

(86) PCT No.: PCT/EP2004/003895

§ 371 (c)(1), (2), (4) Date: Sep. 28, 2005

(87) PCT Pub. No.: WO2005/061906

PCT Pub. Date: Jul. 7, 2005

(65) Prior Publication Data

US 2006/0243935 A1 Nov. 2, 2006

(30) Foreign Application Priority Data

Apr. 11, 2003 (DE) ................................ 103 17 282

(51) Int. Cl.
*F16K 31/12* (2006.01)

(52) U.S. Cl. .......................................... 92/74; 92/85 A

(58) Field of Classification Search ................. 92/12.2, 92/68, 74, 73, 85 A, 85 B, 136, 138
See application file for complete search history.

(56) References Cited

U.S. PATENT DOCUMENTS

| | | | | | |
|---|---|---|---|---|---|
| 2,963,260 | A | | 12/1960 | Vincent | |
| 3,056,573 | A | | 10/1962 | Matheson | |
| 3,148,595 | A | | 9/1964 | Looney | |
| 3,338,140 | A | | 8/1967 | Sheesley | |
| 3,591,127 | A | | 7/1971 | Summers | |
| 4,043,254 | A | * | 8/1977 | Jaeger | 92/85 B |
| 4,094,231 | A | * | 6/1978 | Carr | 92/128 |
| 5,492,050 | A | * | 2/1996 | Holtgraver | 92/74 |

FOREIGN PATENT DOCUMENTS

| | | |
|---|---|---|
| DE | 33 06 480 | 8/1984 |
| DE | 36 13 484 | 10/1987 |
| DE | 93 14 412 | 10/1994 |
| DE | 295 08 917 | 10/1995 |
| DE | 195 32 035 | 4/1996 |

* cited by examiner

*Primary Examiner*—Igor Kershteyn
(74) *Attorney, Agent, or Firm*—Paul Vincent

(57) ABSTRACT

The invention relates to a rotary or pivoting device (10) comprising a housing (12), at least one working piston (14) that is located in the housing and can be impinged by hydraulic fluid and a pivoting part (20), which is rotatably driven by the working piston via a rotary coupling (18) and is rotatably mounted in the housing. According to the invention, the working piston is displaceably mounted in at least one cylindrical tube (22).

20 Claims, 4 Drawing Sheets

ROTARY OR PIVOTING DEVICE AND CONNECTION MODULE FOR A ROTARY OR PIVOTING DEVICE

This application is the national stage of PCT/EP2004/003895 filed on Apr. 13, 2004 and also claims Paris Convention priority of DE 103 17 282.3 filed on Apr. 11, 2003.

BACKGROUND OF THE INVENTION

The invention concerns a rotating or pivoting device having a housing with at least one working piston accommodated in the housing which can be subjected to a pressure medium and with a pivoting member which is mounted to the housing in a rotatable fashion and which can be driven by the working piston via a rotational coupling. The invention also concerns a connection module for a device of this kind.

This type of rotation or pivoting device is e.g. disclosed in DE 330648c2. In these pivoting or rotating devices the working piston is borne in a cylinder formed within a housing. Finishing the surface of the cylinder is relatively difficult, although the cylinder surface must have a very precise finish of high quality in order to guarantee a long lifetime for the device. Moreover, access to the surface of the cylinder is difficult and limited due to the pivoting body and its bearing, which render such access difficult.

It is therefore the underlying purpose of the present invention to propose a rotating or pivoting device which is practical from a manufacturing point of view while nevertheless permitting high precision for the cylinder in which the working piston is borne in a displaceable fashion.

This object of the invention is achieved in a rotating or pivoting device of the above mentioned kind in that the working piston is borne in a displaceable fashion in at least one cylinder tube disposed on a side of the housing. This has the advantage that the cylinder tube can be manufactured as a separate component with highly precise inner dimensions. Cylinder tubes of this kind are easy to handle and process. Very precise inner surfaces on which the working piston abuts can be obtained. This results in a long life time and a very precise pivoting device.

In accordance with the invention, at least one cylinder tube can be advantageously screwed into the housing by means of a thread. This facilitates exchangeability of the cylinder tube. Exchange of the cylinder tube increases the lifetime of the pivoting and rotating device without having to process the housing.

In an additional embodiment of the invention, the working piston can be subjected to pressure on two pressure sides. Towards this end, the cylinder tube can extend up to at least both pressure sides. The cylinder tube thereby advantageously extends at least along the length of the working piston as well as its piston stroke. The prevision of only one single cylinder tube has the advantage that both pressure sides of the working piston can be guided in one and the same cylinder tube.

SUMMARY OF THE INVENTION

It is, however, also conceivable that each pressure side of the piston has a separate cylinder tube in which it is borne for displacement. The two cylinder tubes are thereby disposed along a common axis and are preferably identical. This configuration has the advantage that the region between the two pressure sides of the piston is accessible e.g. to fashion a rotational coupling.

The rotation coupling is advantageously configured in such a fashion that it comprises a rack-type coupling section on the piston side and a pinion on the pivoting member side which engages in combed fashion with the coupling section. When the working piston is subjected to pressure at both sides, the coupling section is preferentially located between the two pressure sides. Instead of a rack-type coupling section with associated pinion, other types of rotational coupling are also possible in accordance with the invention, e.g. frictional couplings.

In a preferred embodiment of the invention, the rotating or pivoting device has at least one connection module for configuration on the free end of the at least one cylinder tube. A connection module can be for example a cover, an extension member, a damping member or some other component which contributes to realization of the particular working behavior of the pivot and rotating device.

The free end of the at least one cylinder tube may advantageously be provided with an outer and/or inner thread for screwing on the connection module. In this manner, the connection module can be easily and safely screwed on and off.

It is also conceivable for the connection module to be sealed on the radially outer side with respect to the housing in such a fashion that an air chamber is formed which is connected to the corresponding pressure chamber. In this fashion, a reliable air guiding is guaranteed, independent of the depth to which the connection module is screwed in.

Towards this end the connection module preferentially has a recess extending in an axial direction in its inner side to connect the air chamber with the pressure chamber. This air-guiding recess can e.g. be configured as a longitudinal groove. The recess preferentially includes radially extending openings on the cylinder tube end sides through which the air can gain entrance from the radially outer side into the radially inner pressure chamber. Sealing means, in particular sealing rings, are provided for sealing.

The rotating or pivoting device should also be adapted to accommodate special pivoting tasks.

A connection module is provided for extending the pivoting device and can be connected to a cylinder tube accepting the working piston of the rotating or pivoting device. The rotating or pivoting properties of the device can be defined in dependence on the configuration of the connection module.

The connection module advantageously has an outer or inner thread for screwing onto the free end of the cylinder tube such that screwing onto the cylinder tube can be effected in a simple manner and without special tools.

The connection module can be a cover member for closing the free end of the cylinder tube. It is also conceivable for the connection module to be configured as an abutment member for axially limiting the stroke of the working piston. Towards this end, the abutment member can also function as a cover which closes the free end of the cylinder tube.

In accordance with the invention, the connection module may also include damping means for damping the abutment of the working piston. This type of damping means can e.g. be bellows, cushions, or the like provided on the inner side of the connection module facing the working piston.

In a particularly preferred embodiment of the invention, the connecting module can be screwed into the cylinder tube at two different depths to change the stroke of the working piston and the associated rotational angle of the pivoting portion in dependence on the depths to which the connection module is screwed in. This has the advantage of being able to adjust the pivoting angle in a simple manner by changing the screw-in depth of the connection module. The connection depths can therefore be used to precisely adjust the rotational angle of the pivoting member.

In order to prevent an undesirable change in the operating position of the connection module and thereby to prevent an undesirable change in the rotational angle of the pivoting part, the invention provides means for fixing the connection module and/or on the housing at a certain pre-determined axial position.

The connection module can be configured in different ways. It may be made from a single part. However, the connection module may also comprise a sleeve which can be screwed onto the cylinder tube and a locking member which can be screwed into the sleeve. Towards this end, the sleeve can be adjusted in the axial direction relative to the cylinder tube and/or the locking member can be adjusted in an axial direction relative to the sleeve.

In another preferred embodiment, the connection module has an abutment member which can be adjusted into at least two positions: an axial inner and an axial outer position, wherein the abutment member can be locked in at least its inner position. An intermediate position is thereby achieved at the axially inner locked position. In the event that the working piston moves against the abutment member in this intermediate position a pivoting of the pivoting member only occurs in this intermediate position. After the locking is released, the working piston moves into its initial position and the pivoting member can also pivot into its initial position.

The connection module advantageously has means for screwing the connection module on and off. Such means can have e.g. a hexagonal socket, a hexagonal head, wings for manual operation or the like. A simple and rapid adjustment, removal or screwing on or off of the connection module is thereby achieved.

Further advantageous details and embodiments of the invention can be extracted from the following description which describes and explains the invention in more detail with reference to the embodiments shown in the drawing.

DESCRIPTION OF THE PREFERRED EMBODIMENT

Figure 1:
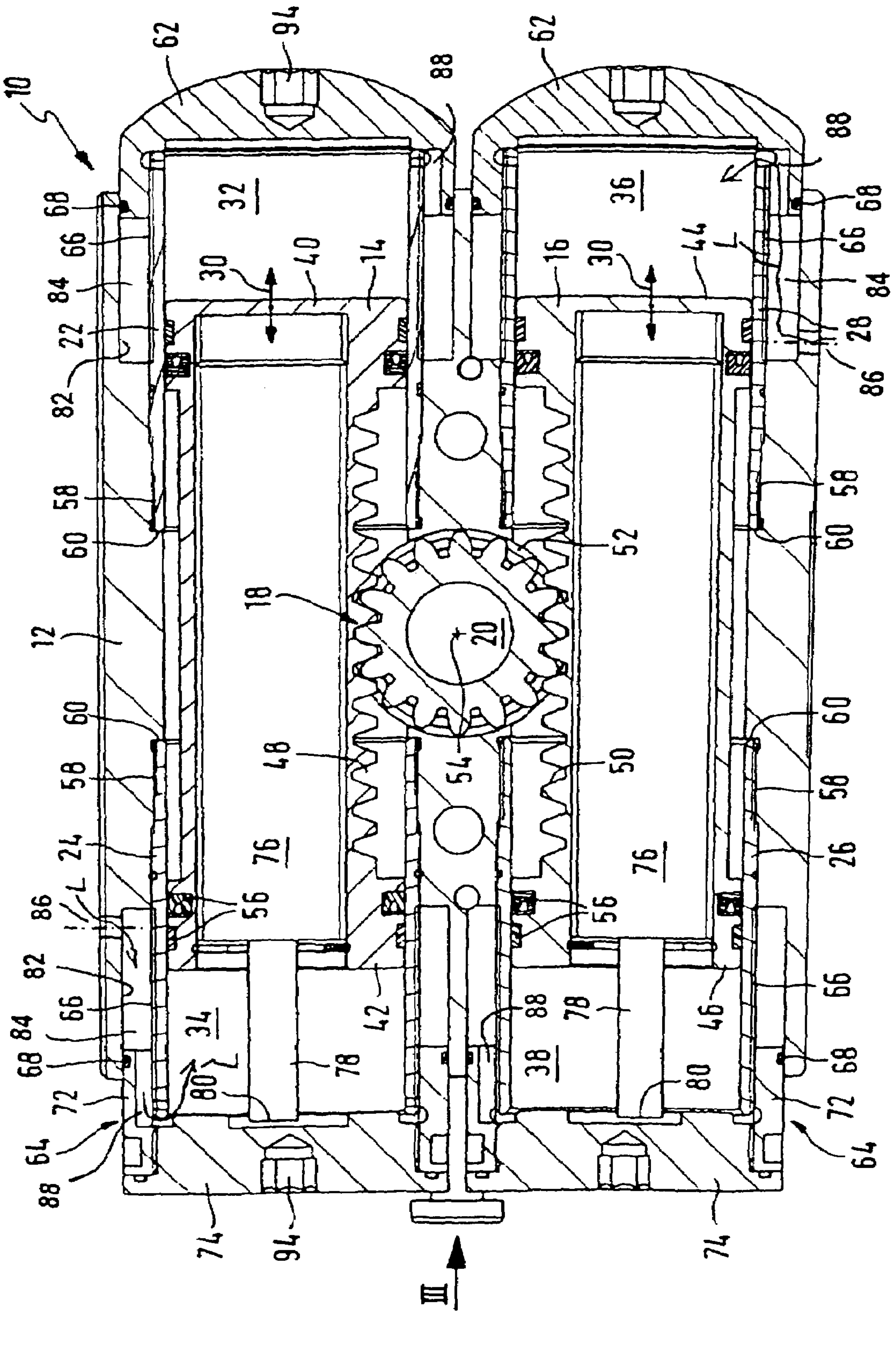
FIG. 1 shows a longitudinal section through a first embodiment of a pivoting device.

The pivoting device 10 shown in FIG. 1 comprises a housing 12 which accommodates two working pistons 14, 16 which can be displaced in a longitudinal direction. The working pistons 14, 16 are rotatably coupled to a pivoting part 20 via a rotating coupling mechanism 18. The two working pistons 14, 16 are disposed in cylinder tubes 22, 24, 26, 28 at the sides of the housing in such a manner that they can be displaced in a longitudinal direction along their longitudinal axis in the direction of the double arrows 30. The two working pistons 14, 16 of the embodiment shown are each designed to be pressurized from two sides. Towards this end, pressure chambers 32, 34 and 36, 38 are provided. The pressure chambers can be connected to pressure storages or pressure outlets via feed and discharge lines (not shown).

On the sides facing each other, the working pistons 14, 16 comprise a coupling section 48 and 50 designed like a piston rod and disposed between their respective pressure sides 40, 42, 44, 46. The two sections 48, 50 mate with a pinion 52 on the pivoting part side which is disposed to be rotatable about the pivot axis 54 of the pivoting part 20 or the pinion 52. In this view, the rotating coupling mechanism 18 of this design causes pivoting of the pivoting part 20 in a counter clockwise direction upon loading of the pressure chambers 32 and/or 38. The pivoting part 20 is pivoted in the clockwise direction upon pressurization of the pressure chambers 34 and/or 36.

The cylinder tubes 22, 24, 26, 28 are designed such that the surfaces of the working pistons are reliably guided in the cylinder tubes during maximum strokes of the working pistons 16, 18. The working pistons 14, 16 have corresponding sealing elements 56 in the region of their pressure sides 40, 42, 44, 46. Instead of providing four separate cylinder tubes 22, 24, 26, 28, each working piston 14, 16 may be disposed in one continuous cylinder tube in an axially displaceable manner. However, openings must be provided in the cylinder tubes in the region of the pinion 52 to permit rotating coupling of the pinion 52 with the corresponding coupling sections 48, 50. It is clear that different rotating coupling mechanisms may be provided instead of the illustrated toothed rack/pinion rotating coupling mechanism, e.g. a non-positive, frictional coupling.

The individual cylinder tubes 22, 24, 26, 28 have outer threads 58 on their sides facing the housing for screwing into the housing 12. For exact axial arrangement of the cylinder tubes, the housing 12 comprises abutment edges 60 against which the respective end faces of the cylinder tubes 22, 24, 26, 28 abut in their finally mounted position. Cylinder tubes can be replaced if required by providing threads 58. Since the cylinder tubes are subjected to wear during operation of the pivoting device 10, only the faulty cylinder tube needs to be replaced in the inventive pivoting device. The other components of the pivoting device, in particular the housing 12, can be reused.

Two connection modules 62, 64 are provided on each free outer end face of the cylinder tubes. The connection modules 62 are cover parts for closing the cylinder tubes 22, 28 and can be screwed onto the free end faces of the cylinder tubes 22, 28. Towards this end, the cover parts 62 have an inner thread and the cylinder tubes 22, 28 have an outer thread 66.

The connection modules 64 are each formed from two parts and have a sleeve 72 and a closing part 74 which is screwed to the sleeve 72. The connection module 64 may also be a component formed from one part. The inner side of the closing part 74 serves as an abutment for the pressure sides 42 or 46 of the working pistons 14 or 16. To damp the impact, the respective working pistons 14, 16 comprise damping means 76 which comprise an abutment rod 78 which is disposed for damped displacement in the axial direction relative to the respective working piston 14, 16. The free end 80 of the respective abutment rod 78 consequently abuts the inside of the closing part 74 and damps the working piston 14, 16 which moves in the direction of the respective closing part 74.

The connection modules 64 can be screwed, at different depths, into outer threads 66 provided on the respective cylinder tubes 24, 28 via corresponding threads, wherein the stroke of the respective working piston 14, 16 and therefore the angle of rotation of the pivoting part 20 can be changed via the screwing-in depth of the connection modules 64.

On their respectively radial outer side, the connection modules 62, 64 or the sleeves 72 and the cover parts 64 have a circumferential groove with a sealing ring 68. The sealing rings 68 have a sealing effect on radially inner cylinder surfaces 82 of the housing 12 which extend in an axial direction. The cylinder surfaces 82 and the sleeves 72 or the cover parts 62 define air guiding chambers 84 which can be connected to pressure lines (not shown) via connections 86. The respective inner side of the connection modules 62, 64, which extends in an axial direction, has at least one recess 88 for guiding air to the respective pressure chambers 32, 34, 36, 38, the recess(es) extending to the respective cylinder tube end face facing the connection module 62, 64. The recesses 88 may be formed, in particular, as axial grooves. The recesses 88 may comprise additional recesses which extend in a radial direction on the cylinder tube end faces.

To pressurize or pressure-relieve the pressure chambers 32, 34, 36, 38, air can consequently flow in the direction of arrow L from the connections 86 into the respective pressure chamber 32, 34, 36, 38 via the air guiding chambers 84 and respective recess 88. Reliable air guidance is ensured in the described arrangement irrespective of the screwing-in depth of the respective connection module 62, 64. Moreover, the position of the connections 86 on the housing side is the same for different screwing-in depths.

Figure 2:
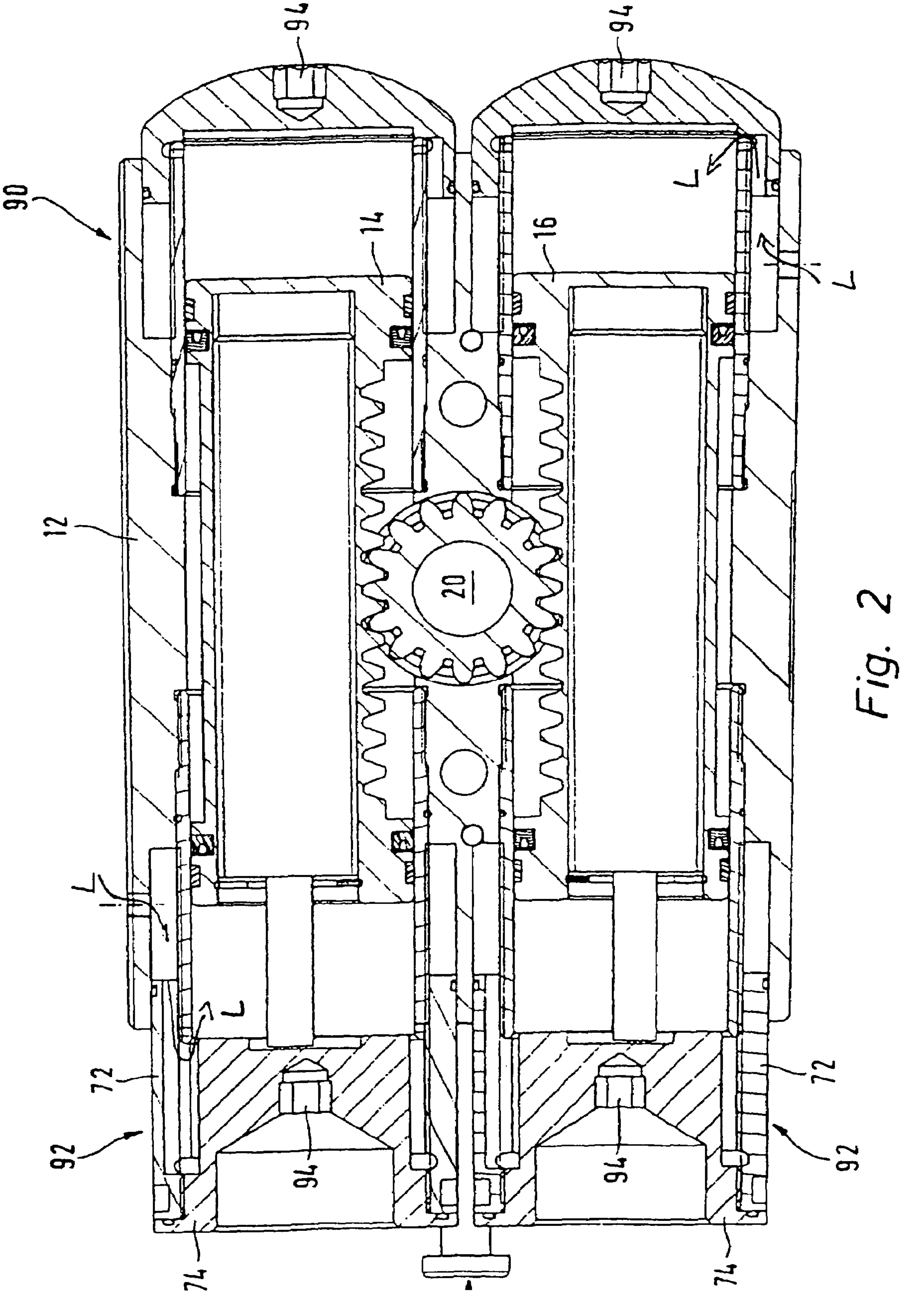
FIG. 2 shows a longitudinal section through a second embodiment of a pivoting device.

The pivoting device 90 shown in FIG. 2 substantially corresponds to the pivoting device 10 of FIG. 1. Corresponding components have corresponding reference numerals. In contrast to the pivoting device 10 of FIG. 1, which merely permits relatively small axial adjustment of the connection modules 64, the pivoting device 90 of FIG. 2 has connection modules 92 with sleeves 72 extending relatively far in the axial direction, which permits variation of the pivot angle of the pivoting part 20 within a larger region. In particular, the connection modules 92 can limit the stroke of the working pistons 14, 16 to a larger degree than the connection modules 64 of the pivoting device 10 of FIG. 1 due to the relatively long extension of the closing parts 74 in the direction of the housing 12. Depending on the screwing-in depth of the connection modules 92, the pivot angle of the pivoting part 20 can consequently be changed within a relatively large range. To permit simple and easy adjustment of the pivot ranges, the connection modules 62, 64 and 92 have screwing-on or unscrewing means in the form of a hexagonal socket 94.

Figure 3:
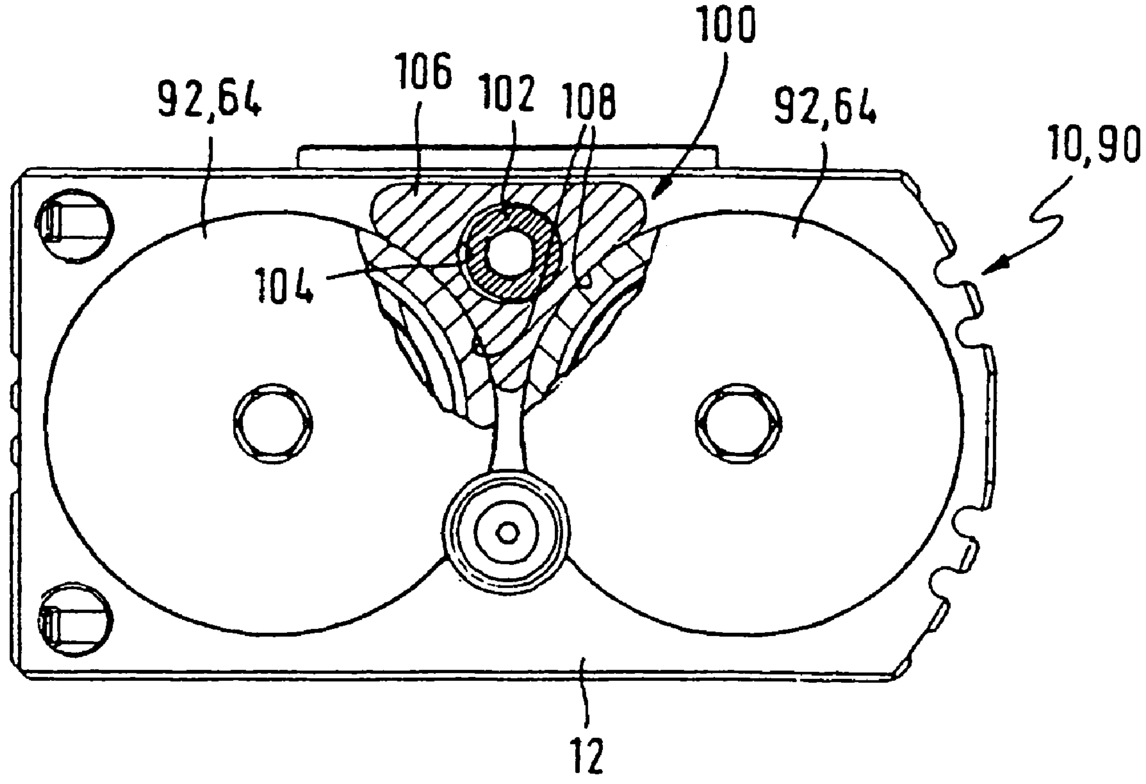
FIG. 3 shows a front view of the pivoting device in accordance with FIG. 1 or FIG. 2.

FIG. 3 shows a view in the direction of the arrow III onto the pivoting device 10 in accordance with FIG. 1 or the pivoting device 90 in accordance with FIG. 2. This view shows means 100 for fixing the connection modules 64 or 92 in their axial position. The fixing means 100 comprise a fixing pin 102 which is retained in the housing 12 and designed like a screw bolt comprising an eccentric head and a clamping part 106 which is penetrated by the fixing pin 102. The eccentric head of the fixing pin 102 is thereby seated in a cylindrical recess 104 in the clamping part 106. The clamping part 106 has two clamping surfaces 108 which abut against the respective surfaces of the connection modules 64, 92. When the fixing pin 102 is turned, the clamping part 106 is clamped between the two connection modules 64, 92 by the eccentric head. The eccentric head of the fixing pin 102 thereby acts against the wall of the cylindrical recess 104 of the clamping part 106 to fix the connection modules 64, 92 via the clamping surfaces 108. To release fixing, the fixing pin 102 is turned through between a quarter and a half of a rotation. The connection modules 64, 92 are thereby fixed in a simple and yet very effective manner.

To retain the fixing pin 102 in an axial direction, the fixing pin may have a radial circumferential groove into which a retaining pin engages that extends transversely to the longitudinal axis of the fixing pin 102 in such a manner that the fixing pin 102 is held such that it can be rotated but not displaced in its axial direction.

Figure 4:
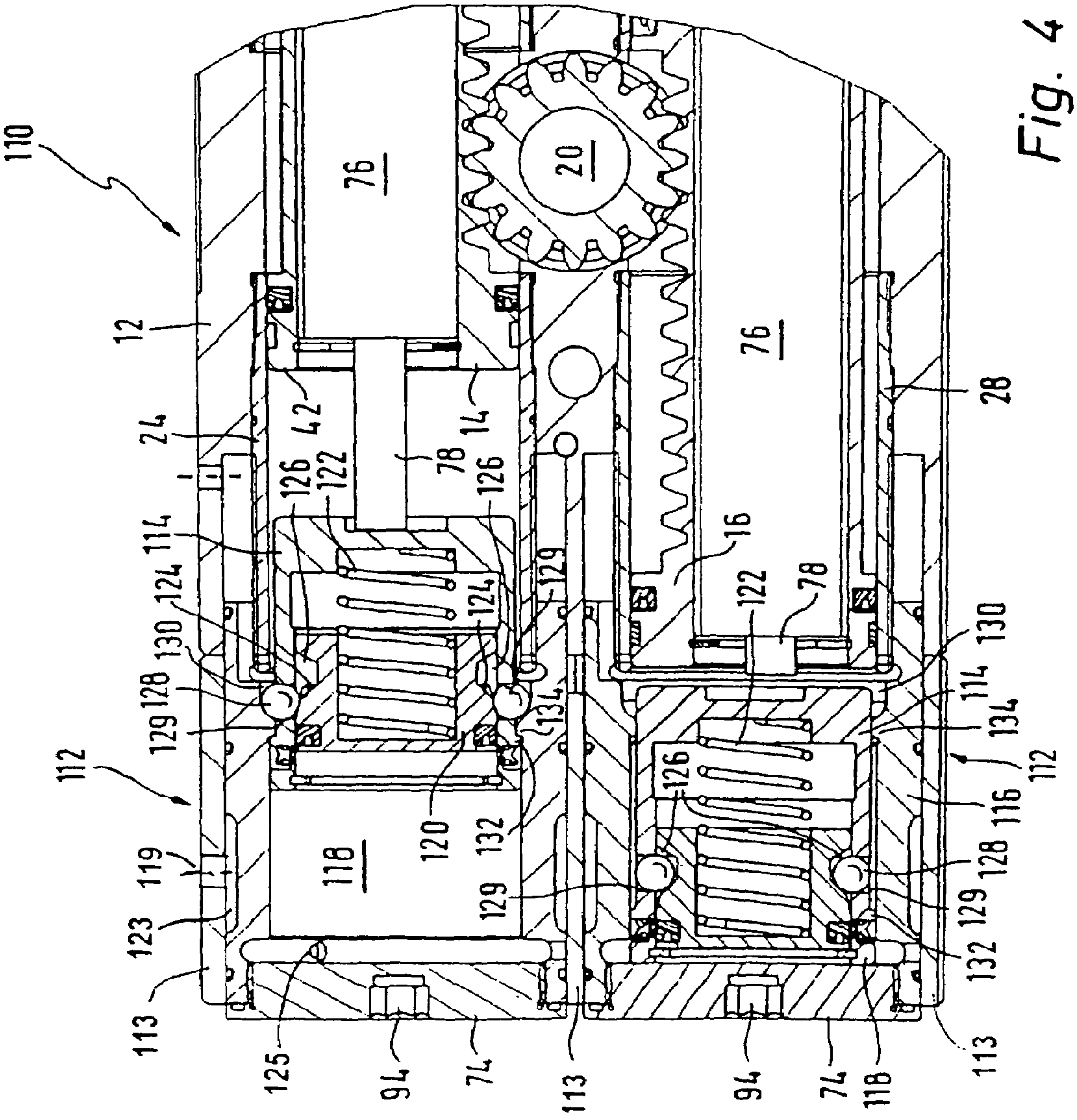
FIG. 4 shows a partial longitudinal section through a third embodiment of a pivoting device.

The pivoting device 110 of FIG. 4 comprises a housing 12 corresponding to the pivoting devices 10 and 90 with corresponding components which have reference numerals corresponding to the pivoting devices 10, 90 of FIGS. 1 and 2. The free end faces of the cylinder tubes 24, 28 of the pivoting device 10 comprise connection modules 112, each having one abutment part 114 which can be displaced to two positions and can be locked in its axially inner position. The working pistons 14, 16 and therefore the pivoting part 20 can thereby be moved to a predetermined intermediate position. The abutment part 114 facing the pressure side 42 is thereby in the locked intermediate position.

The connection modules 112 each have a sleeve 116 accommodated in a common additional housing 113, in which the piston-like abutment part 114 is disposed in an axially displaceable manner. Towards this end, a pressure chamber 118 is provided on the side of the abutment part 114 facing away from the respective working piston 14, 16. The pressure chamber 118 is pressurized or pressure-relieved via a pressure connection 119. The air is thereby guided into or out of the pressure chamber 118 via a radially outer circumferential annular groove 123 on the respective sleeve 116 and via openings which are connected to the groove 123 and, in particular, have the form of bores 125.

Upon pressurization of the pressure chamber 118, the abutment part 114 is moved into the intermediate position. Towards this end, the abutment part 114 moves towards the respective working piston 14, 16 until its collar-like abutment 132 strikes against an abutment 134 on the sleeve side. Due to pressurization of the pressure chamber 118, a locking piston 120 which is disposed to be axially displaceable on the inner side of the abutment part 114 is moved against the spring force of a pressure spring 122 towards the respectively associated working piston 14, 16. The locking piston 120 has inclined guiding surfaces 124 which adjoin a receptacle 126 for locking balls 128. In the initial position, the locking balls 128 are partially disposed in the receptacles 126 and partially in openings 129 extending in a radial direction and provided on the abutment part 114. The wall of the regions of the abutment part 114 surrounding the openings 129 thereby have approximately half the ball diameter. Preferably several locking balls 128 disposed at equal separations from each other are provided over the periphery of the abutment part.

Upon displacement into the locking position, the balls 128 are forced from their receptacles 126 via the inclined guiding surfaces 124 in a radial outer direction into locking receptacles 130 provided on the inner side of the sleeve 116. The locking receptacles 130 extend in radial directions approximately by half a ball diameter. The locking receptacles 130 can either be formed as individual receptacles or as one single circumferential, groove-like receptacle.

The geometries of the receptacles 126, the locking balls 128, the openings 129 and the locking receptacles 130 are designed such that, in the locked intermediate position, axial forces exerted by the respective working piston 14, 16 or by the damping means 76 on the respective abutment part 114 are diverted via the locking balls 128 into the sleeve 116 and from the sleeve via screw connections between the sleeve and the housing 12, to the housing 12.

The locked intermediate position is maintained until the pressure chamber 118 is pressurized. If the pressure chamber 118 is pressure-free, the locking piston 120 is initially displaced in an axial outer direction via the pressure spring 122. The locking balls 128 thereby drop into the receptacles 126. Through movement of the working piston 14, 16 against the abutment part 114, the abutment part 114 including locking piston 120 and locking balls 128 are carried along in an axial outward direction until the abutment part 114 has reached its initial position followed by pivoting of the pivoting part 20 into the initial position.

In consequence thereof, the intermediate position can advantageously be activated or deactivated through pressurization or pressure-relieve of the pressure chamber 118. One particular advantage of the described embodiment is that return of the abutment part 114 is possible even under axial loads through releasing the pressure in the pressure chamber 114.

The described pivoting devices 10, 90 and 110 permit flexible use since they all comprise identical housings 12 or identical cylinder tubes. Depending on the application of the pivoting devices, corresponding connection modules 62, 64, 92 or 112 may be provided. The connection modules can be exchanged with little expense and using simple tools.

All the features shown in the description, the claims and the drawing may be essential to the invention either individually as well as in arbitrary combination.

We claimed:

1. A rotating or pivoting device comprising:

a housing;

at least one working piston disposed in said housing for loading with a pressurized medium located in a pressure chamber defined within said housing;

a pivoting part mounted for rotation in said housing;

a rotational coupling mechanism disposed between said pivoting part and said working piston to drive said pivoting part by said working piston;

a least one cylinder tube disposed on a side of said housing, said at least one cylinder tube bearing said working piston for displacement thereof, said cylinder tube having a thread at an end thereof facing away from said housing;

a connection module screwed onto said cylinder tube thread;

sealing means disposed between a radially outer side of said connection module and said housing to define an air chamber, said air chamber communicating with said pressure chamber; and pressure connection means disposed on said housing for supplying a pressurized medium to said pressure chamber via said air chamber.

2. The device of claim 1, wherein said working piston can be subjected to pressure via two pressure sides.

3. The device of claim 2, wherein said cylinder tube extends to said two pressure sides.

4. The device of claim 3, wherein each pressure side of said piston is borne for displacement in a separate cylinder tube.

5. A device of claim 1, wherein said rotational coupling mechanism comprises a piston-sided rack-like coupling section and a pinion disposed on said pivoting member side in combed engagement with said rack-like coupling section.

6. The device of claim 1, wherein said thread is disposed on a free end of said cylinder tube for accepting said connection module, said thread being an outer or an inner thread.

7. The device of claim 1, wherein said sealing means are disposed between a radially outer surface of said connection module and a radially inner cylinder surface of said housing in such a manner that said air chamber is created independent of a screw-in depth of said connection module.

8. The device of claim 1, wherein said connection module has at least one recess extending in an axial direction on an inner side for connection of said air chamber to said pressure chamber.

9. The device of claim 8, wherein said the recess has a radially extending opening in a cylinder tube end side.

10. The connection module for the rotation or pivoting device of claim 1, the connection module structured and dimensioned for disposition on a free end of said cylinder tube in which said working piston of the rotation or pivoting device is borne for displacement.

11. The connection module of claim 10, wherein the connection module has an outer and/or inner thread for screwing onto said free end of said cylinder tube.

12. The connection module of claim 10, wherein the connection module constitutes a cover component for closing-off said free end of said cylinder tube.

13. The connection module of claim 10, wherein the connection module is an abutment part for axial stroke limitation of said working piston.

14. The connection module of claim 10, wherein the connection module includes damping means for damped abutment of said working piston.

15. The connection module of claim 10, wherein the connection module is structured to screw onto said cylinder tube at differing depths for changing a stroke of said working piston, wherein a rotational angle of said pivoting part depends on a screw-in depth of said connection module.

16. The connection module of claim 15, further comprising arresting means for fixing a location of said connection module at a pre-determined axial position, said arresting means disposed on the connection module and/or on said housing.

17. The connection module of claim 10, wherein the connection module comprises a sleeve which can be screwed onto said cylinder tube as well as a closing part in screwed engagement with said sleeve.

18. The connection module of claim 17, wherein said sleeve can be adjusted in an axial direction with respect to said cylinder tube and/or said closing part can be adjusted in an axial direction with respect to said sleeve.

19. The connection module of claim 11, wherein the connection module comprises an abutment part which can be displaced into at least an axially inner and an axially outer position, wherein said abutment part can be locked in its inner position.

20. The connection module of claim 10, wherein the connection module has at least one recess extending in an axial direction at an inner side for fashioning a connection between said air chamber and said pressure chamber.

* * * * *